United States Patent [19]

Symons et al.

[11] 4,127,701

[45] Nov. 28, 1978

[54] REFUELABLE ELECTRICAL ENERGY STORAGE DEVICE

[75] Inventors: Philip C. Symons, Birmingham; Carmelo J. Amato, Livonia, both of Mich.

[73] Assignee: Energy Development Associates, Madison Heights, Mich.

[21] Appl. No.: 730,288

[22] Filed: Oct. 6, 1976

Related U.S. Application Data

[63] Continuation of Ser. No. 462,282, Apr. 19, 1974, abandoned, which is a continuation of Ser. No. 200,070, Nov. 18, 1971, abandoned.

[51] Int. Cl.$^2$ ............................................. H01M 8/06
[52] U.S. Cl. ........................................ 429/19; 429/17
[58] Field of Search .................. 429/15, 51, 22, 17, 429/19, 27

[56] References Cited

U.S. PATENT DOCUMENTS

| | | | |
|---|---|---|---|
| 2,921,110 | 1/1960 | Crowley et al. | 429/29 |
| 3,414,437 | 12/1968 | Daundoulakis | 429/15 |
| 3,682,705 | 8/1972 | Petix | 429/28 |
| 3,713,888 | 1/1973 | Symons | 429/51 |
| 3,758,342 | 9/1973 | Baba | 429/22 |
| 3,847,671 | 11/1974 | Leparulo | 429/15 |

Primary Examiner—John H. Mack
Assistant Examiner—H. A. Feeley
Attorney, Agent, or Firm—Stanley H. Lieberstein

[57] ABSTRACT

An electrical storage battery consisting of one or a plurality of cells, each comprised of a normally positive electrode for reducing a halogen disposed in electrical contact therewith and a normally negative electrode having an oxidizable metal disposed in electrical contact therewith during an electrical discharge of the cell. The cell is filled with an aqueous metal halide electrolyte which is adapted to be circulated between the cell and a storage area containing a replenishable halogen hydrate which is progressively consumed during discharge of the battery. A replenishment of the oxidizable metal is also effected periodically accompanied by a withdrawal of a controlled portion of the electrolyte to maintain the volume thereof within a preselected range.

10 Claims, 5 Drawing Figures

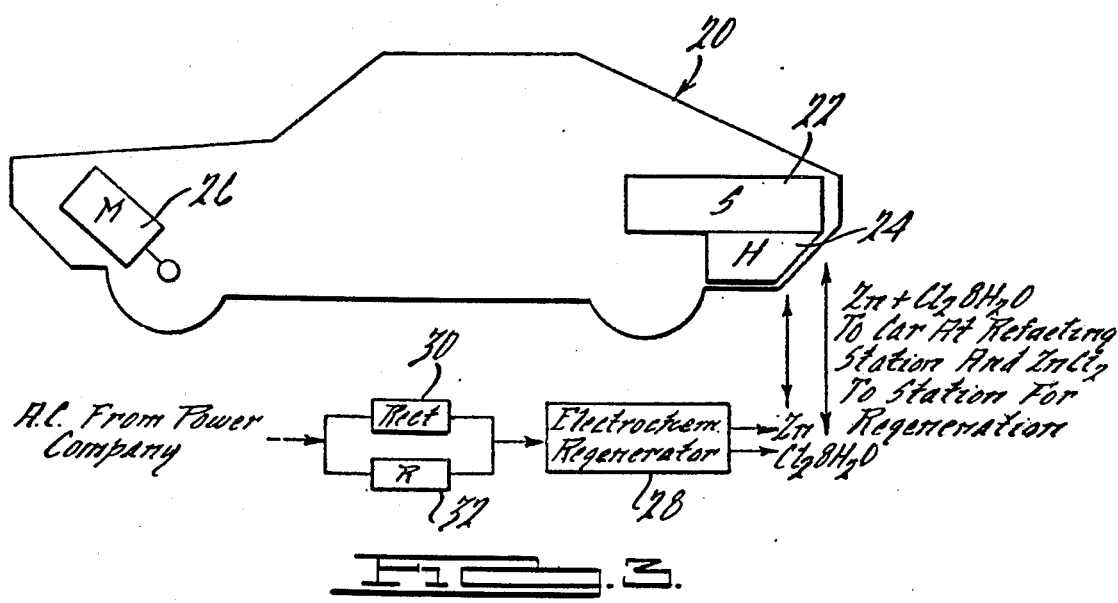
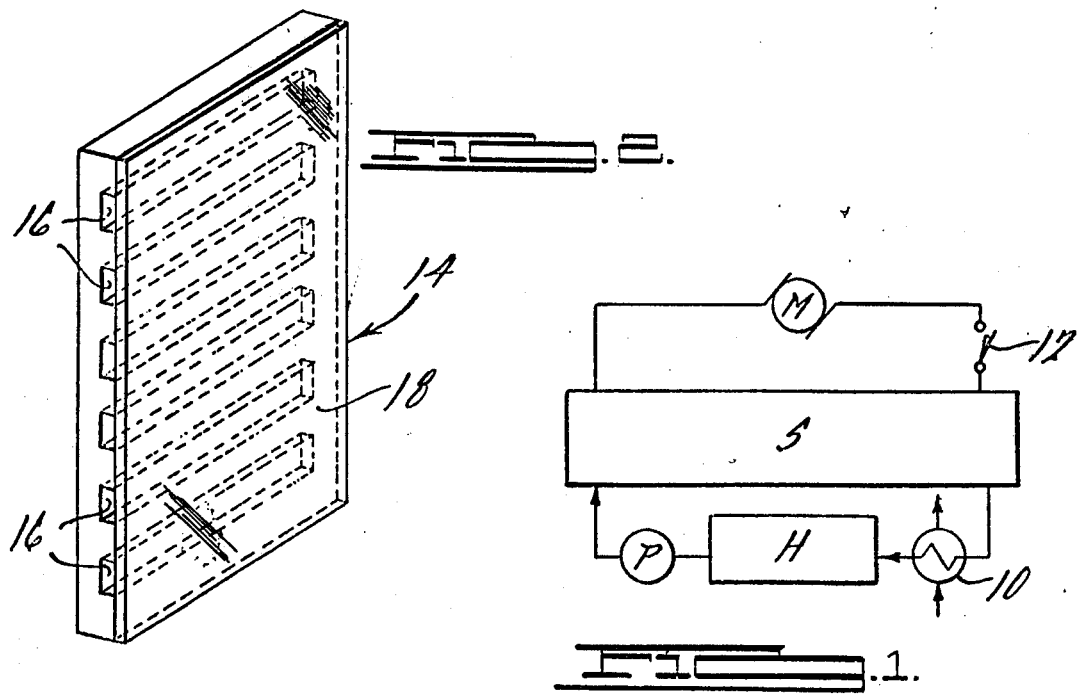

REFUELABLE ELECTRICAL ENERGY STORAGE DEVICE

This is a continuation of application Ser. No. 462,282 filed Apr. 19, 1974, which was a continuation of application Ser. No. 200,070, filed Nov. 18, 1971, both now abandoned.

BACKGROUND OF THE INVENTION

A variety of electrical energy storage devices have heretofore been used or proposed for use either as the principal or as a back-up source of electrical energy. Electric storage batteries of a type which are capable of supplying at least about 50 watt hours of electric power per pound of weight have been conveniently classified as high energy density (H.E.D.) storage batteries which, because of their compactness and high energy capacity, are eminently satisfactory for use in a variety of stationary and mobile power plant systems. In spite of the impetus created by public demand to replace conventional fossil-fueled internal combustion engines as the primary propulsion source for vehicles due to the pollution associated with such engines in congested urban areas, no satisfactory high energy density electric storage device has been proposed up until the time of the present invention which satisfies the myriad of technical and economic requirements that must be met in order to render such electric storage devices commercially acceptable.

A continuing heretofore unfilled need has been the provision of an economical electric storage battery which is of high energy storage capacity and which permits a simple and rapid refueling of the battery to restore it to its fully charged condition. Prior art type electric storage devices have generally been of excessive weight and/or size, slow to recharge and defective in many instances due to the potential toxicity and danger associated with the chemical constituents utilized in the generation of electric current, as well as the relatively complex and critical controls required to monitor the electrical discharge of such devices to maintain a safe and efficient operation thereof.

The present invention overcomes the problems and deficiencies associated with prior art electric energy storage devices in that it employs readily available and relatively inexpensive materials which can conveniently be generated at a central facility and physically inserted into the system, thereby effecting a refueling thereof with a minimal expenditure of time and effort.

SUMMARY OF THE INVENTION

The benefits and advantages of the present invention are achieved by a refuelable electrical energy storage device which comprises one or a plurality of cells, each consisting of a normally positive electrode for reducing a halogen adapted to be disposed in electrical contact therewith and a normally negative electrode adapted to have an oxidizable metal disposed in electrical contact therewith during periods when the cell is electrically discharging. An aqueous metal halide electrolyte is employed in the cell and conduit means are provided for circulating the electrolyte between the cell or cells and a storage reservoir in which a halogen halide is stored and is progressively decomposed in response to the consumption of halogen at the positive electrode. The storage reservoir is adapted to be completely replaced with a comparable reservoir filled with a fresh supply of halogen hydrate, effecting a refueling of the storage device or, alternatively, the reservoir is provided with means for physically introducing the halogen hydrate to effect a replenishment of the supply thereof. Similarly, the oxidizable metal is adapted to be physically replenished at periodic intervals either by the direct addition of the metal into the cell and in electrical contact with the normally negative electrode or, alternatively, by a replacement of the negative electrode with a refueled electrode incorporating a fresh supply of oxidizable metal thereon. In addition to the foregoing, the decomposition of the halogen hydrate and the solution of oxidized metal and reduced halogen in the electrolyte effects a progressive increase in the volume thereof during the course of discharge of the storage device, whereby portions of the electrolyte are withdrawn at appropriate intervals so as to maintain the total volume within a preselected operating range. The periodic withdrawal of electrolyte can conveniently coincide with the refueling cycles of the halogen hydrate and/or the oxidizable metal.

In stationary electrical energy storage systems, the refueling of the storage battery can simply be achieved by delivering a fresh supply of oxidizable metal and halogen hydrate to the site of the power plant on an appropriate schedule conforming with use of the storage device. In mobile power plant systems, such as those utilized on vehicles, a replenishment or refueling of the electrical energy storage device can conveniently be achieved at roadside stations whereby modular sections of the storage device can be replaced with refueled modules with only a minimal expenditure of time and effort. The depleted modules, including the electrolyte containing the dissolved metal halide salt, can be regenerated either at such service station or at a central processing plant to recreate the elemental oxidizable metal and the halogen hydrate for reuse in refueling the storage device.

Still other benefits and advantages of the present invention will become apparent upon a reading of the description of the preferred embodiments taken in conjunction with the accompanying drawings.

BRIEF DESCRIPTION OF THE DRAWINGS

FIG. 1 is a schematic diagram of the electrical energy storage device electrically connected to a motor;

FIG. 2 is a perspective view of an electrode formed with a plurality of cavities which are adapted to be refueled with an oxidizable metal;

FIG. 3 is a diagrammatic view of the refuelable storage battery as applied to a vehicle in accordance with one embodiment of the present invention;

DESCRIPTION OF THE PREFERRED EMBODIMENTS

Figure 4:
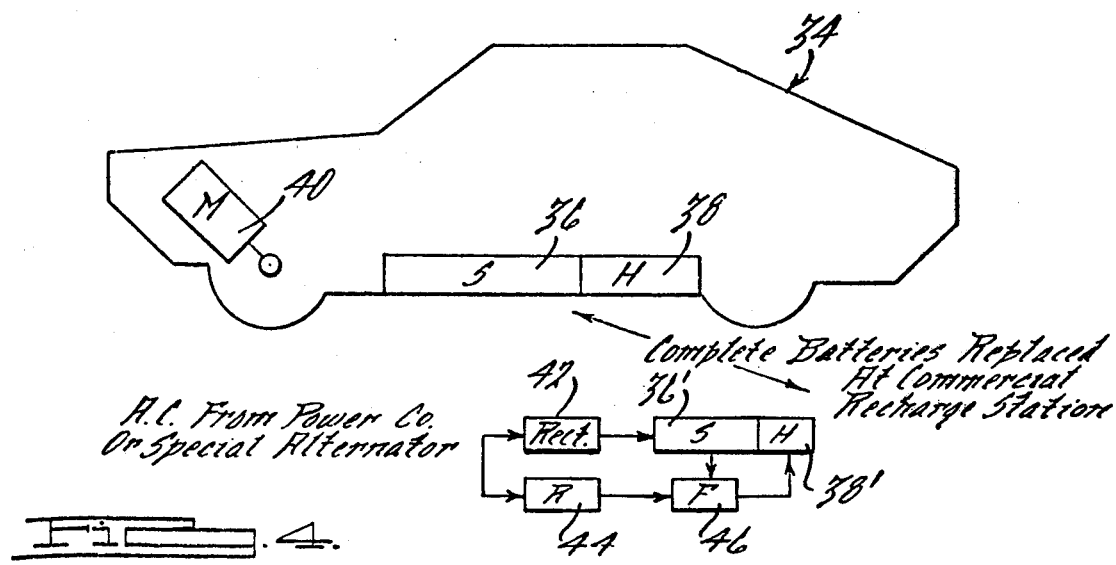
FIG. 4 is a diagrammatic view of the refuelable storage battery as applied to a vehicle in accordance with another satisfactory embodiment of the present invention.

The electrical energy storage system utilizing a halogen hydrate, an oxidizable metal and an aqueous electrolyte containing a dissolved metal halide is described in detail in copending United States patent application Ser. No. 50,054, filed June 26, 1970, entitled "Halogen Hydrates", which is owned by the assignee of the present invention. Reference is made to the aforementioned United States patent application for further details of the high energy density storage battery and the chemistry of its operation beyond that herein disclosed. The oxidizable metal/halogen hydrate electrical energy storage system in essence comprises an electrolyte comprising a solution containing a dissolved metal halide and a dissolved and/or entrained halogen gas which is adapted to be reduced upon coming in electrical contact with a positive electrode during the normal discharge of the storage device. In addition to the foregoing essential constituents, various other additives and ingredients can be incorporated in the liquid electrolyte to provide controlled modifications in the physical and chemical properties thereof in order to improve the efficiency of operation. Preferably the electrolyte is comprised of an aqueous solution which contains from about 0.1% by weight up to a saturated concentration of a metal halide consisting of metals selected from the group consisting of the Group VIII of the Periodic Chart (namely: Fe, Co, Ni, Ru, Rh, Pd. Os, Ir and Pt), metals of the Lanthanum Series (namely: Ce, Pr, Nd, Pm, Sm, Eu, Gd, Tb, Dy, Ho, Er, Tm, Yb, and Lu), and Actinium Series (namely: Th, Pa, U, Np, Pu, Am, Cm, Bk and Cf), in addition to Zn, Sc, Ti, V, Cr, Mn, Cu, Ga, Y, Zr, Nb, Mo, Tc, Ag, Cd, In, Sn, Hf, Ta, W, Re, Au, Hg, Tl, Pb, Bi, Li, K, and Na, Pb, Cs, Be, Mg, Ca, Sr, and Ba. Those metals which react with water may be alloyed to induce stability and are used as amalgams (solutions in mercury). Of the foregoing metals, zinc constitutes the most preferred metal, while iron, cobalt, and nickel are preferable to the remaining enumerated metals. The preferred halogen constituents are chlorine and bromine, of which the chloride salts of the preferred metals are particularly suitable and constitute the preferred embodiment. Particularly satisfactory results are obtained employing aqueous solutions containing zinc chloride as the metal halide.

While concentrations as low as about 0.1% of the metal halide in the aqueous electrolyte can be employed, it is preferred that concentrations of at least about 5% to 50% and more usually, from about 10% up to about 35%, by weight be used. When utilizing zinc chloride as the metal halide, maximum conductivity of the electrolyte is attained at a concentration of about 25% by weight, whereby concentrations of this specific material in the electrolyte ranging from about 10% to about 35% are particularly satisfactory.

The electrochemical reaction occurring during discharge of the storage battery is typified by the following equations:

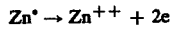
$Zn^* \rightarrow Zn^{++} + 2e$

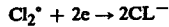
$Cl_2{}^* + 2e \rightarrow 2CL^-$

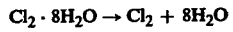
$Cl_2 \cdot 8H_2O \rightarrow Cl_2 + 8H_2O$

The foregoing equations are for a storage battery in which the oxidizable metal is zinc, the halogen is chlorine and the hydrate is a chlorine hydrate which progressively decomposes to supply additional chlorine in the aqueous electrolyte to replenish that which is reduced at the positive electrode and enters the electrolyte in the form of a chloride ion along with the oxidized zinc metal ion. Since water is added to the electrolyte as the result of the progressive decomposition of the halogen hydrate, the concentration of the metal halide salt in the electrolyte remains reasonably constant throughout the discharge phase of the storage battery. The volume of electrolyte, of course, progressively increases and such increased volume beyond a preselected amount can be periodically withdrawn and subjected to reprocessing for recovery of the elemental metal and the corresponding halogen hydrate.

A typical closed system of the electrical energy storage device is schematically illustrated in FIG. 1 and comprises an electrode area or stack, indicated at S, comprised of one or a plurality of cells, each comprised of a positive electrode and a negative electrode, which are disposed in communicative contact with a hydrate storage area, indicated at H. The aqueous electrolyte is circulated, such as by means of a pump P, from the storage reservoir through the electrode area S and thence back to the reservoir for replenishing the chlorine gas or other halogen gas consumed in the electrode area during the generation of electrical current. Since the decomposition of the halogen hydrate is endothermic, it is desirable in some instances to provide a heat exchanger, indicated at 10, for supplying heat to the electrolyte prior to its entry into the hydrate reservoir H to facilitate a decomposition or "melting" of the hydrate and an entrainment of the halogen gas in the electrolyte. In accordance with the arrangement illustrated in FIG. 1, the electrical current generated is connected to a load, such as a motor indicated at M, which is controlled by means of a switch 12 interposed in series in the electrical circuit.

A replenishment of the oxidizable metal and halogen hydrate and a withdrawal of the generated excess electrolyte must be performed at prescribed time intervals depending upon the specific structural features of the storage battery. In structural arrangements whereby a greater supply of oxidizable metal can be incorporated, a replenishment of the oxidizable metal can be accomplished at less frequent intervals than the replenishment of the halogen hydrate. For example, in a typical vehicle arrangement, a replenishment of the oxidizable metal such as zinc can be effected at the end of each 20-hour discharge period corresponding to about 1000 miles; whereas, the halogen hydrate constituent can be replenished at shorter intervals, such as at the end of each four hours of discharge corresponding to about 200 road miles driven. The replenishment cycle of the halogen hydrate corresponds in general to the average refueling cycle of conventional gasoline-fueled internal combustion engine propelled vehicles.

A replenishment of the oxidizable metal can be performed by a replacement of the entire stack of electrodes, by replacement of only the negative electrodes or, alternatively, by a physical introduction of elemental oxidizable metal into the electrode area, such as in the form of plates, rods or slugs inserted into the electrode area or, alternatively, in the form of metallic particles introduced as a slurry in the aqueous electrolyte solution. In this latter connection, a negative electrode 14, illustrated in FIG. 2, which may suitably be composed of a conductive nonreactive material such as graphite for example, is formed with a plurality of cavities or slots 16 in one face thereof which extend inwardly from one edge of the electrode to a point spaced from the opposite edge thereof. A porous separator material 18, which is comprised of a chemically resistant nonconductive material such as polytetrafluoroethylene-coated glass cloth, is suitably bonded or otherwise secured to the face of the electrode 14. The porous separator 18 is of a controlled porosity relative to the particles of metal introduced in the electrolyte slurry so as to serve as a filter effecting a retention of the particles in the slots 16 in response to the inward flow of the slurry into the open ends thereof. The electrolyte slurry is pumped through the electrode area until substantially all of the slots 16 of the negative electrodes 14 have been filled with elemental oxidizable metal restoring the storage device to a completely refueled state.

A replenishment of the halogen hydrate constituent may most conveniently be effected by a physical removal of the storage reservoir H and a replacement thereof with a similar reservoir fully filled with the halogen hydrate. This constitutes a preferred technique in that the replacement of the reservoirs simultaneously effects a withdrawal of the increased quantity of electrolyte generated during the preceding discharge cycle.

In addition to the foregoing, a replenishment of the halogen hydrate can also be achieved by introducing the halogen hydrate in the form of minute particles suspended as a slurry in the electrolyte; as solid pellets or preformed blocks which can be readily inserted in the reservoir H; as a composite structure comprising an inert skeletal framework serving as a carrier for the halogen hydrate supported thereon and therein; and in the form of minute particles of a size enabling a fluidization thereof utilizing the gaseous halogen of which the hydrate is comprised as the fluidizing and carrier medium. In any event, a replenishment of the hydrate is effected in order to provide a continuous supply of halogen gas for reduction at the positive electrode during the discharge cycle of the storage device.

A periodic withdrawal of electrolyte which may coincide with the replenishment cycles of the halogen hydrate and/or oxidizable metal is most conveniently achieved, as previously indicated, during the replacement of the hydrate storage reservoir which has itself become filled with electrolyte to replace the consumed halogen hydrate. Alternatively, an accumulator can be provided in the circulatory system in which an accumulation of generated electrolyte can be performed and which accumulator can periodically be drained to maintain the total volume thereof within system limitations. In installations in which the halogen hydrate is physically replenished directly into the storage reservoir H as shown in FIG. 1, an appropriate drain system can be incorporaed on the reservoir for withdrawing the electrolyte prior to replenishment thereof with halogen hydrate.

It will be apparent from the foregoing that in both stationary auxiliary electrical storage systems and in mobile electrical storage systems, a rapid and simple refueling of the battery is effected to restore it to a fully recharged condition without undergoing any appreciable shut-down time periods or expensive and tedious recharging procedures as necessitated in prior art type electrical storage systems. In accordance with the practice of the present invention, a regeneration of the replenishable constituents of the storage battery can be conveniently, efficiently and economically accomplished at a central or regional processing station in which the consolidated withdrawn electrolyte is electrically processed to effect a deposition of the metallic constituent and a regeneration of the halogen gas which, in response to appropriate cooling in the aqueous medium, effects a formation of the halogen hydrate which is separated and recovered. Such central or regional processing stations can process the electrolyte by purchasing electrical alternating current from utilites at more favorable rates during off-peak hours utilizing large-scale equipment whereby optimum efficiency and economy is attained.

A typical refuelable electrical energy storage device as applied to a vehicle is illustrated in FIG. 3. As shown, a vehicle 20 is provided with a permanently installed electrode stack area 22 and a hydrate reservoir 24 which are adapted to be periodically refueled or replenished at roadside service stations. The stack electrode area 22 is electrically connected to a drive motor 26 for propelling the vehicle. In the specific embodiment illustrated, the service station is provided with an electrochemical regeneration unit 28 which is operated on alternating current purchased commercially from the power utility and is rectified by means of a rectifier 30 for supplying direct current to the regeneration unit 28. A suitable refrigeration unit 32 is also powered by purchased alternating current for cooling the regeneration unit to a level at which the halogen gas formed in the presence of water will form the corresponding halogen hydrate which comprises an exothermic reaction. In the specific arrangement shown in FIG. 3, the oxidizable metal and the halogen hydrate are each separately produced and are mechanically or physically inserted into the stacks 22 and reservoir 24, respectively, accompanied by a withdrawal of a portion of the aqueous metal halide containing electrolyte for reprocessing in the regeneration unit 28.

In accordance with an alternative satisfactory arrangement illustrated in FIG. 4, a vehicle 34 incorporating a refuelable storage battery of the present invention is refueled by a physical removal of both the electrode stack 36 and hydrate storage reservoir 38 at a suitable roadside service station which are replaced by a refueled electrode stack 36' and hydrate storage reservoir 38' regenerated at the station. The vehicle, as in the prior case, is propelled by a suitable motor or electrical propulsion device 40 disposed in driving relationship with respect to the ground.

As in the case of the embodiment shown in FIG. 3, the arrangement schematically shown in FIG. 4 also relies on the purchase of electrical power from the local utility which is rectified to produce direct current by means of a rectifier 42. Alternatively, suitable direct current can be supplied by means of an alternator or direct current generator. The electrical current is employed to power a refrigeration unit 44 for cooling the electrolyte and also for applying a reverse polarity to the electrode area 36', effecting a recharging thereof. The halogen gas generated during the recharging cycle is transferred to a suitable hydrate former 46 operatively associated with the refrigeration unit 44 and the halogen hydrate formed is conveniently recycled back to the hydrate reservoir 38'. In this specific embodiment, the withdrawal of electrolyte occurs with the removal of the storage battery system and which in turn is regenerated in situ to redeposit oxidizable metal on the negative electrodes and to replenish the halogen hydrate in the hydrate reservoir.

Figure 5:
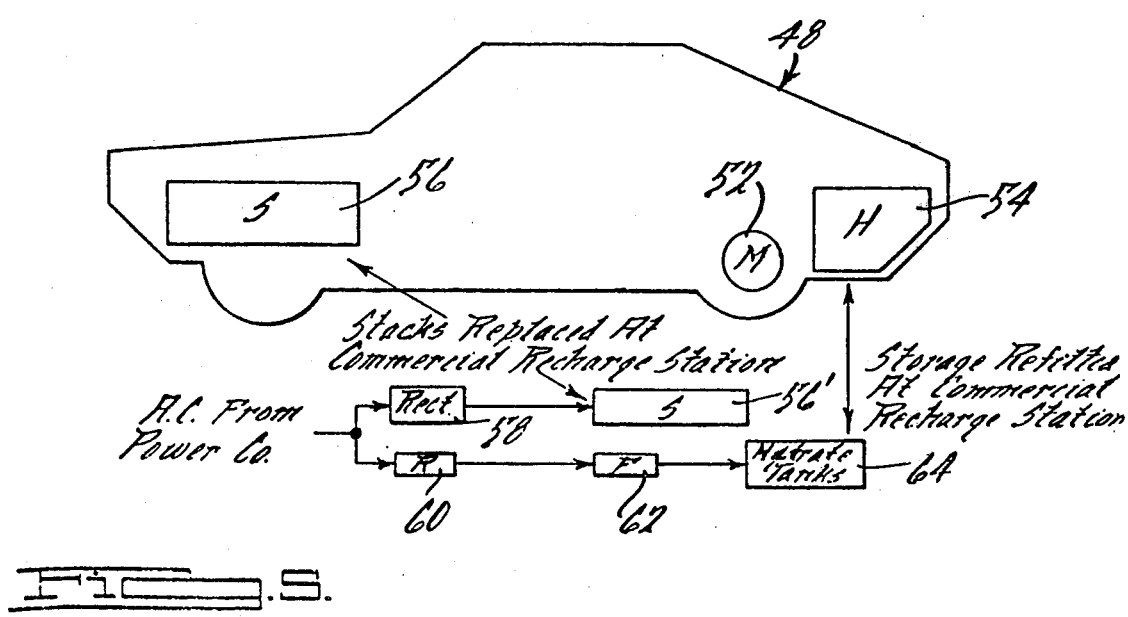
FIG. 5 is a diagrammatic view of the refuelable storage battery as applied to a vehicle in accordance with still another alternative satisfactory embodiment of this invention.

Still another alternative satisfactory embodiment of the refuelable storage battery is illustrated in the arrangement shown in FIG. 5. The mobile vehicular arrangement shown includes a vehicle 50 propelled by a motor 52 drivingly coupled to the wheels and including a permanently installed hydrate reservoir 54 adapted to be replenished with hydrate at a service station and a removable electrode stack 56 adapted to be completely replaced by a replenished electrode stack 56' at a roadside service station. As in the prior embodiments, commercially purchased alternating electric current is converted to direct current by a rectifier 58, which in turn is employed to recharge a depleted electrode stack 56' by plating the metal ions out on the normally negative electrode. A refrigeration unit 60 is also powered by the commercially purchased electric energy for supplying coolant to a hydrate former 62 in which the halogen hydrate is regenerated and which is stored in a hydrate storage tank 64 at the roadside station. A physical replenishment of the vehicle's hydrate reservoir 54 is achieved by a transfer of regenerated hydrate from the storage tank 64 directly into the reservoir 54.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. In a refuelable electrical energy storage device comprising: a) at least one cell having an inlet means and an outlet means, said cell containing a normally positive electrode for reducing halogen disposed in electrical contact therewith and a normally negative electrode having an oxidizable metal disposed in electrical contact therewith during electrical discharge of said cell; b) a storage reservoir means containing a quantity of halogen hydrate and having an inlet means and an outlet means; c) an aqueous metal halide electrolyte; d) communicative means for connecting said cell outlet means with said reservoir inlet means and for connecting said reservoir outlet means with said cell inlet means; and e) circulating means for circulating said electrolyte through said communicative means between said cell and said reservoir, thereby bringing halogen hydrate or its thermal decomposition products, namely, halogen and water, into said cell during discharge; the improvement which comprises f) means for introducing an oxidizable metal, beyond that present in said circulating electrolyte, into said cell to replenish at least a portion of said metal which has been consumed during discharge; g) means for introducing halogen hydrate which has not been formed by said circulating electrolyte into said reservoir to replenish at least a portion of the quantity consumed during discharge; and h) means for withdrawing at least a portion of the electrolyte formed during discharge of said cell to maintain volume thereof within a preselected range.

2. An electrical energy storage device as defined in claim 1, wherein said halogen comprises chlorine.

3. An electrical energy storage device as defined in claim 1, wherein said oxidizable metal comprises zinc.

4. An electrical energy storage device as defined in claim 1, wherein said storage reservoir is adapted to be replaced by a second storage reservoir containing a supply of halogen hydrate to effect a replenishment thereof.

5. An electrical energy storage device as defined in claim 1, wherein said cell is adapted to be replaced with a second cell containing a supply of oxidizable metal in electrical contact with said normally negative electrode for effecting a replenishment of said oxidizable metal.

6. An electrical energy storage device as defined in claim 1, wherein said means for introducing oxidizable metal into said cell comprises means to replace said normally negative electrode from said storage device with a second negative electrode incorporating a fresh supply of said oxidizable metal thereon.

7. An electrical energy storage device as defined in claim 1, wherein the oxidizable metal is introduced into said cell as a slurry of said electrolyte containing entrained particles of said oxidizable metal.

8. An electrical energy storage device as defined in claim 1, wherein said storage reservoir is formed with filler means disposed in communication with the interior thereof and adapted to permit the introduction of halogen hydrate in a solid form through said filler means.

9. An electrical energy storage device as defined in claim 1, wherein the halogen hydrate is selected from the group consisting of chlorine hydrate and bromine hydrate.

10. An electrical energy storage device as defined in claim 1, wherein the means or introducing the oxidizable metal into said cell comprises metal plated negative electrode adapted to be inserted into said cell.

* * * * *